UNITED STATES PATENT OFFICE.

REIMAN G. ERWIN, OF ST. ALBANS, WEST VIRGINIA, ASSIGNOR TO INTERNATIONAL BITUCONCRETE COMPANY, A CORPORATION OF DELAWARE.

PLASTIC COMPOSITION AND PROCESS FOR MAKING THE SAME.

1,409,088. Specification of Letters Patent. Patented Mar. 7, 1922.

No Drawing. Original application filed July 6, 1920, Serial No. 394,189. Divided and this application filed November 11, 1920, Serial No. 423,396. Renewed January 4, 1922. Serial No. 527,058.

*To all whom it may concern:*

Be it known that I, REIMAN G. ERWIN, a citizen of the United States, residing at St. Albans, in the county of Kanawha and State of West Virginia, have invented certain new and useful Improvements in Plastic Compositions and Processes for Making the Same, of which the following is a specification.

My invention relates to roofing, flooring and allied structures such as are described in my co-pending application Serial No. 394,189, matured into Patent No. 1370637, for plastic compositions and processes for making the same, filed July 6, 1920, of which this application is filed in division, in which bituminous compounds act as binders of mineral aggregates; and my present objects are to provide (*a*) a plastic composition of mineral aggregate, impalpable mineral dust and a bituminous compound, in which lasting ductility is present in cold exposures, (*b*) higher melting and flow points of the bituminous content is secured in relation to temperature changes, (*c*) increased density and inherent stability and (*d*) greater economy over the prior art.

In carrying out my invention as disclosed in copending joint application Serial No. 389,482, filed June 16, 1920, for pitch cements, I have discovered that when there is present only such colloidal dust as therein described (as distinguished from adventitious dust mixed with larger fines of 200 mesh sieve size and larger, such as are invariably specified in bituminous structures known to the prior art) and that when such chemically treated bitumen as therein described is present in such a mastic in quantity in excess of that required to impregnate the dust, coat it and bind it together, such excess of bitumen in that mastic, in its relation to the present invention, will be adsorbed by added mineral aggregate, with the advantageous result that the mastic acts as a more stable filler of interstices of such aggregate, and such filler is of greater inherent strength and density than pure bituminous compounds heretofore used, or mastics composed of non-colloidal dust of insufficient impalpability and untreated bitumen, as heretofore used, and, indeed such mastic as herein used, so acts as a filler of greater inherent stability, density and strength than the mineral aggregate herein specified, the interstices between which my mastic fills after the excess bitumen thereof has been adsorbed and used at the impregnating binder coating the added aggregate.

Accordingly, when the interstices between the aggregate of such structures are to be filled as herein specified, the heretofore essential specific grading of sizes of such aggregate, and the mechanical clasp thereof in their relation to each other, may be dispensed with without affecting, except to increase, the density, compressive strength and inherent stability of the structure of which such filler forms a part.

In carrying out the present invention in its relation to roofing, in example, I have discovered that when pulverized lime is added to a mixture of colloidal dust, sulphur, sodium chloride and sodium sulphate and injected into the bitumen in the manner described in said co-pending joint application, a tougher, stiffer and relatively harder product is produced, which is more adaptable to roofing purposes than my more ductile products of the present process, in which I eliminate the lime, in cases, for example, where the material is to be used for flooring; and I have further discovered that when the product is formed by compression into the desired shape through a die, reinforcing wire or other such agent imbedded therein and surrounded by the plastic mass when hot during the process of forming the product, will still further strengthen the product and render more permanent its desired shape, regardless of stresses to which it may be subjected.

In practice I inject, in air suspension, into preheated bitumen in a vat subjected to sustained heat and suction a mixture of the above stated chemicals, in proportions hereinafter specified, with dehydrated clay or other dust of from 2 to approximately 2.8 specific gravity (or the equivalent volume of kieselguhr of from .30 to .40 specific gravity) composed entirely of colloidal particles, viz., all those passing a 200 mesh sieve, exceeding 60% being smaller than .02 millimeters in gradations down to smaller than two microns, and after complete dehydration of the mass therein, I subject the same to continued heat to combine the ingredients and their derivatives together.

For the purpose of the present invention

I prefer to add to such dust the following percentages thereof, viz., of sulphur 6 to 10%, lime 5 to 8%, sodium chloride 1 to 5%, sodium sulfate 1 to 5%, in pulverized form, the dust and chemicals mixture so injected into the bitumen being in proportion by volume 40 to 60% respectively.

While the mastic above described is at a temperature of approximately 300 to 350 deg. Fahr., I mix the same with preheated mineral aggregate of run-of-the crusher sizes, in proportions, 40 to 60% of the mineral aggregate and mastic respectively. In practice I have noted that a relatively larger proportion of colloidal dust than has been practically dispersed in such products of the prior art, is suspended in the bituminous composition, and is practically agglomerated in my final product without an excess of bitumen present therein. I then agitate the mass in a vat under the influence of sustained heat and suction a sufficient length of time to completely dehydrate the mass, and to raise its temperature uniformly to approximately 250 deg. Fahr., at which time the mass is removed from the vat and compacted through dies, or in sheet form by tamping, rolling, or molded into blocks.

I claim:

1. The process of producing a plastic composition consisting in colloidally suspending a mixture of mineral dust, sodium chloride, sodium sulphate, and lime with, and injecting sulphur into, preheated bitumen in a vat subjected to suction and to sufficient heat to combine the ingredients and their derivatives, then mixing various sizes of mineral aggregate in the absence of dust with said composition in sufficient quantity of the latter to fill the interstices, to partially impregnate and to coat and bind together the mineral aggregate under pressure, then agitating the mass in a vat under the influence of suction and sufficient heat to fix its temperature at approximately 250 deg. Fahr., uniformly, then removing the mass from the vat and compacting the same to shape, substantially as described.

2. A composition of matter comprising mineral dust of colloidal nature suspended in bitumen combined with sodium chloride, sodium sulphate and sulfur derivatives in the following proportions: of dust and the above mentioned chemicals 40% to 60%, of bitumen 40 to 60%, and an aggregate comprising mineral particles, 40 to 60% of such aggregate being suspended in from 60 to 40% of said bituminous composition.

In witness whereof I have hereunto set my hand in the presence of two witnesses this ninth day of November, 1920.

REIMAN G. ERWIN.

In the presence of—
G. A. HENDERSON,
C. H. ZERKLE.